(12) United States Patent
Reynolds et al.

(10) Patent No.: US 6,337,362 B1
(45) Date of Patent: Jan. 8, 2002

(54) ULTRAVIOLET RESISTANT PRE-MIX COMPOSITIONS AND ARTICLES USING SUCH COMPOSITIONS

(75) Inventors: William Reynolds, Barnegat; Robert Van Doren, Lawrenceville, both of NJ (US)

(73) Assignee: Elementis Specialties, Inc., Hightstown, NJ (US)

( * ) Notice: Subject to any disclaimer, the term of this patent is extended or adjusted under 35 U.S.C. 154(b) by 0 days.

(21) Appl. No.: 09/591,496

(22) Filed: Jun. 12, 2000

(51) Int. Cl.[7] .............................. C08K 3/34; C08L 63/02
(52) U.S. Cl. ...................... 523/442; 106/419; 523/454; 523/455; 523/461; 524/91; 524/101; 524/291; 524/359; 524/432
(58) Field of Search .............................. 523/442, 454, 523/455, 461; 106/419; 524/96, 101, 291, 359, 432

(56) References Cited

U.S. PATENT DOCUMENTS 5,876,688 A * 3/1999 Laundon ...................... 423/622

FOREIGN PATENT DOCUMENTS

GB 2293827 * 4/1996

* cited by examiner

Primary Examiner—Margaret G. Moore
Assistant Examiner—D. Aylward
(74) Attorney, Agent, or Firm—Michael J. Cronin

(57) ABSTRACT

The compositions described include micronized zinc oxide UV blocking agents with at least one organic UV protective compound. Premix compositions are provided for imparting improved UV resistance to paints, coatings, finishes and plastic articles comprising both micronized inorganic zinc oxide and organic UV protective compounds suitable for easy later inclusion into paint, coating, finish and plastic articles formulations.

30 Claims, No Drawings

ULTRAVIOLET RESISTANT PRE-MIX COMPOSITIONS AND ARTICLES USING SUCH COMPOSITIONS

FIELD OF THE INVENTION

The present invention relates generally to ultraviolet (UV) resistant products such as paints, coatings, finishes, plastic articles and the like as well as to methods for the production thereof. Specially, the invention relates to compositions for use as premixes in the production of a variety of such UV resistant products particularly paints and coatings. More particularly, the present invention relates to products containing inorganic UV resistant agents in the form of micronized zinc oxide materials in combination with one or more ultraviolet-absorbing or protective organic compounds; hereinafter organic UV protective compounds and to compositions designed to serve as premixed additives for use in the manufacture of diverse products requiring protection from UV degradation wherein the premix compositions contain micronized particulate inorganic zinc oxide materials in combination with one or more organic UV protective compounds.

BACKGROUND OF THE INVENTION

A. Historical

Small particle size (i.e., micronized) non pigmentary zinc oxide have been used heretofore as UV blocking/scattering additives. For example, such micronized zinc oxide particles have been dispersed in polymer substrates for the purpose of minimizing ultraviolet radiation degradation of the substrates. The zinc oxide particles either scatter or absorb harmful ultraviolet radiation thereby reducing damage to the polymer substrate. The polymer substrates into which such particles have been dispersed include paints and other coatings and plastic articles and the like which are used outdoors and hence are exposed to solar radiation. An example of a plastic article which has included zinc oxide particles for UV weatherability is polyvinyl chloride siding used in the construction or renovation of buildings and homes.

While the ability of zinc oxide to absorb and scatter ultra-violet radiation is well known, conventional zinc oxide is typically a white, opaque powder and as such is unacceptable in appearance for use in applications (for examples clear coatings and plastics) where transparency is essential. Recently it has been discovered that reducing the particle size of zinc oxide to below the wavelength of visible light will result in visible light being transmitted through the zinc oxide thereby causing it to appear virtually transparent when in a dispersed form, e.g. a dispersion in oil or in a polymeric substrate. Moreover, such small particle size metal oxides have the added advantage of more effectively scattering and absorbing ultra-violet light.

Palmer et al. U.S. Pat. No. 5,504,134 describes attenuation of polymer substrate degradation due to ultraviolet radiation through the use of metal oxide particles (i.e., zinc oxide) in a size range of about 0.001 micrometer to about 0.20 micrometer in diameter, and more preferably from about 0.01 to about 0.15 micrometers in diameter.

Laundon U.S. Pat. No. 5,876,688, the disclosure of which is incorporated by reference, issued to assignee hereto, teaches a method for producing micronized zinc oxide particles that are small enough to be transparent when incorporated as UV blocking/scatterring agents in paints, coatings, finishes, plastic articles, cosmetics and the like which are well suited for use in the present invention.

The ability to manufacture small size transparent zinc oxide particles such as those described in U.S. Pat. No. 5,876,688 has greatly enhanced the desirability of incorporating zinc oxide as a physical sunblock agent in products such as cosmetic sunscreen compositions. For example, U.S. Pat. No. 5,587,148, discloses sunscreen formulations comprising micronized particles of pure, zinc oxide sunblock suspended in a dermatalogically suitable liquid carrier, preferably in the form of an emulsion. The patentee states that micronized zinc oxide particles measuring up to about 0.2 microns in diameter can form a visibly transparent sunscreen when applied to human skin. These particles are said to be capable of absorbing a substantial quantity, if not all, of the UV radiation to which the user is exposed.

In contradistinction with zinc oxide i.e. inorganic particulate materials discussed above, i.e., the micronized zinc oxides which act as physical agents to scatter or block UV radiation, there are numerous well-known organic compounds which protect against solar damage by virtue of chemical structures which absorb UV radiation or generate free radicals as scavengers to inhibit the harm caused by UV light. Such organic UV-protective compounds have been disclosed in the art for dermatalogical use, for example, see Siddiqui et al U.S. Pat. No. 6,015,548 and Liu et al U.S. Pat. No. 5,916,544; but also for use in non-dermatological thermoplastic polymeric compositions. Examples of organic UV absorbers are disclosed in U.S. Pat. No. 6,015,548 include ethylhexyl methoxycinnamate, padimate O, oxybenzone, octyl salicylate, TEA salicylate, octocrylene, homosalate, menthyl anthranilite and the like. Examples of UV absorbing compounds typically used in plastics fabrication are the benzophenones, the benzotriazoles, the triazines and the hindered amine light stabilizers as disclosed, for example, in Lau et al U.S. Pat. No. 6,051,637 and Samuels U.S. Pat. No. 6,051,637. U.S. Pat. No. 5,916,544 describes concentrates for sunscreens for skin in the form of dispersions which include ultrafine titanium dioxide, zinc oxide and mixtures thereof with an organic sunscreen agent and a polyvinylpyrroliidone alkylated with a $C_4$–$C_{36}$ alpha-olefin dispersing aid. Zinc oxide synergist systems are known which used zinc dimethyl and diethyl dithiocarbonates with pigmentary zinc oxide in polyolefin. Commercially, CIBA sells combination products of metal oxides, hindered amines and stearates (trade name Tinuvin 492 and 494) as light stabilizers.

However, pre-mix compositions suitable for UV protection of paints, coatings, finishes, plastic articles and the like have not been known or described heretofore which employ both inorganic micronized metal oxide particles and organic UV protective compounds. Premix compositions containing micronized metal oxides such as zinc oxide and at least one organic UV protective composition which are adapted for use in formulating paints, coatings, finishes, plastic articles, and the like have not been known or disclosed previously.

B. Object of the Invention

It is an object of the present invention to provide a UV stabilized paints, coatings, finishes, and the like in which UV protection is afforded by introducing therein a mixture of a micronized UV blocking inorganic zinc oxide and at least one UV organic protective compound.

Another object of this invention is to provide UV stabilized plastic articles in which UV protection is afforded by introducing therein a mixture of a micronized UV blocking inorganic zinc oxide, and at least one organic UV protective compound.

A further most important object of this invention is to provide premix compositions containing micronized zinc oxide, and one or more organic UV protective compound in predetermined proportions adapted for admixture with substrates in the manufacture of paints, coatings, finishes, and plastic articles.

Yet another object of the invention is to provide a composition containing a predetermined amount of a micronized zinc oxide thereof and a predetermined amount of one or more organic UV protective compounds in the form of a premix composition, wherein the proportion of predetermined amounts of the ingredients of the premix are selected to satisfy the requirements for the specific end product into which the premix composition is to be incorporated.

These and other objects will become apparent hereinafter to a person skilled in the art.

SUMMARY OF THE INVENTION

In a preferred embodiment of the present invention, it has been found that one or more of the above-identified objects, and others, can be accomplished utilizing an ultraviolet protective premix composition optionally comprising a binder/substrate material and/or a polymeric resin substrate; a micronized particulate inorganic zinc oxide, and at least one organic UV protective compound. Such composition may be employed in paints, coatings, finishes and the like or in plastic articles. In this regard, when the composition of this invention is used in products such as paints, coatings, finishes and, a liquid coating (oil-based or water-based) or it may be a powdered polymeric coating.

In a further preferred embodiment, the present invention is directed to an ultraviolet resistant plastic article comprising a polymeric substrate; particulate inorganic zinc oxide sunblock, and at least one organic UV protective compound. It is to be understood that other inorganic compounds such as titanium dioxide may optionally also be included.

In another most preferred embodiment of this invention, we have found that the compositions of this invention can be prepared as premixes or pre-blends to provide intermediate or precursor materials for later inclusion in such products as paints, coatings, finishes and the like or in plastic articles. Most preferably, these premixes are adapted to be incorporated into the paints, coatings, finishes or plastic articles in an effective amount and are formulated to contain a mixture of micronized zinc oxide having a particle size in the range of about 1 to about 200 nanometers and an organic UV protective compound with the metal oxide being present in an amount of about 30% to about 60% by total weight of the mixture and the organic UV protective compound percent being present in an amount of about 3 to about 10 percent by total weight of the mixture.

As referenced herein, paints, coatings, plastics and finishes are used to describe a wide variety of materials designed to adhere to a substrate and act as a thin plastic-like layer or to be a solid plastic product.

Paints, coatings and finishes are generally liquids before they are applied to a surface. When applied, they should completely replace the substrate/air interface with a substrate/paint interface. Thereafter, the paint/coating/finish drys and/or cures to form a hard film on the substrate surface. In manufacturing paints/coatings/finishes, a wide variety of materials may be used but they can be generally classified into four categories: (1) binders; (2) pigments; (3) solvents; and (4) additives. Binders (or resins) are generally organic compounds, usually polymeric or oligomeric in nature, which provide a continuos matrix in a final film and have a major influence on the toughness, flexibility, gloss, chemical resistance and cure/dry properties of the coating. Common binders/sbstrate materials for use in producing paints, coatings and finishes include latexes (dispersions of high molecular weight polymer particles in aqueous media); solvent-borne analogues of latexes known as non-aqueous dispersions (NADs); solvent-borne coatings covering a wide variety of resins including alkyds, epoxies, polyurethanes, polyesters, amino crosslinkers (primarily, modified melamines); silanes, silane derivatives and other inorganic binders and the like.

The inorganic sunblock agent for use in the compositions of the present invention is preferably a micronized zinc oxide having a particle size in the range of about 1 to about 200 nanometers, and preferably about 10 to about 150 nanometers. The organic UV protective compound may comprise any of the known organic UV absorbers or stabilizers and as well future organic based compounds.

In accordance with the present invention, a method of manufacturing ultraviolet resistant products such as paints, coatings, finishes and plastic articles is provided wherein a sufficient amount of a binder/substrate material effective to act as a base for the production of the products is provided and an effective amount of a premix composition comprising a micronized particulate zinc oxide UV blocking agent and at least one organic UV protective compound is admixed with the binder/substrate material to produce the products.

The compositions and articles of the present invention provide a significant advantage over conventional UV stabilized paints, coatings, finishes and plastic articles in that they afford the synergistic benefit of the interaction of a micronized zinc oxide sunblock and an organic UV protective compound.

Surprisingly, we have discovered that the combination of the inorganic and organic UV absorbers/protective compounds works better for UV stabilization of paints, coatings, finishes and plastics than either of the additives used alone. Moreover, it is surprising that organic UV protective compound of the type of which typically are employed in sunscreen, sunblock and cosmetic preparations would find suitability for use in residential and industrial paint, coating, finish and plastics applications along with zinc oxide of the type described above.

DETAILED DESCRIPTION

Generally speaking, the present invention, in one aspect, concerns UV stabilized paints, coatings, finishes or plastic articles which comprise both (i) an inorganic zinc oxide sunblock agent; and (ii) an organic UV protective agent selected from the group consisting of organic compounds which absorb UV radiation and organic compounds which act as stabilizers against UV degradation.

In a most important aspect, the invention is directed to premix compositions in which a micronized zinc oxide is pre-blended with an organic UV protective compound in such proportions that the premix composition can be conveniently added to (i.e., simply dispersed or admixed in) paint, coatings, finishes and the like and/or in plastic articles.

Inventive paints, coatings, finishes and plastic articles (e.g., vinyl siding, skylight windows, etc.) incorporating the combined organic/inorganic UV protective agents of the present invention it is believed exhibit overall improved resistance to UV degradation in comparison to the coatings and articles which rely solely upon an inorganic micronized metal oxide for sunblock protection; or solely upon organic UV stabilizers.

Inorganic UV Protective Agents

Typical UV protective agents can be grouped into two broad categories, i.e., organic and inorganic (or physical). The present invention requires, as a first principal component, an inorganic agent comprising micronized zinc oxide particles. The size of the metal oxide particles in the present invention should be selected based on the desired end use of the UV stabilized composition or article in which the composition of the invention is to be used. In compositions and articles such as plastics, paints and coatings the average size of the metal oxide particles must be of sufficiently small size, i.e., "micronized" so as to be in a size range of about 1 to about 200 nanometers, and preferably in the range of about 10 to about 150 nanometers and, most preferably, about 80 nanometers or less.

Fine particle zinc oxide suitable for use in the invention may be prepared using methods well known in the art. With respect to the preparation of micronized zinc oxide, see for example commonly assigned Laundon U.S. Pat. No. 5,876,688 which is incorporated herein by reference in its entirety. Also relevant is Palmer et al U.S. Pat. No. 5,504,134, also incorporated by reference herein. The Laundon '688 patent discloses a method for obtaining micronized zinc oxide in the size range of from about 1 to about 200 nanometers, and preferably about 10 to about 150 nanometers.

A most suitable micronized zinc oxide may be obtained commercially under the trade name "TZO" from Elementis Specialties, located in Hightstown, N.J. Micronized zinc oxide particles of the TZO type provide excellent UV absorption in both the UV-A and UV-B ranges. Known inorganic sunblocks includes titanium dioxide; however, for reasons of superiority cost and effectiveness, zinc oxide is the UV blocking agent of this invention.

A particularly preferred zinc oxide for use in paints, coatings and other polymeric articles comprising polymer substrates that are vulnerable to UV degradation comprise the micronized and/or non-micronized zinc oxide disclossed in Laundon et al. U.S. Pat. 5,876,688; and Palmer et al. U.S. Pat. No. 5,504,134 assigned to Kerr-McGee Chemical Corporation.

The zinc oxide selected may be from wurtzite or amorphous zinc oxide.

For wurtzite zinc oxide particles, the optimum size for attenuation of ultraviolet radiation is in the range of from about 0.05 micrometer to about 0.06 micrometer for the wavelength range of from about 0.3 to about 0.4 micrometer. Absorption and refraction are the dominate mechanism for attenuation of ultraviolet radiation by zinc oxide particles in substrates in the aforementioned ultraviolet wavelength range useful in this invention.

Monosized particles are preferred for use in accordance with this invention. The preferred use is of zinc oxide micronized particles, the diameters of the particles in the distribution being within the broad range of diameters given herein, i.e., from about 0.001 micrometer to about 0.20 micrometer and at least 50% by weight of the total particles used are in the size range of from about 0.01 micrometer to about 0.15 micrometer in diameter. Particularly preferred are micronized zinc oxide particles having an average particle size of about 80 nanometers or less in diameter and a surface area of about 12.5 $m^2/g$.

Organic UV Protective Agents
Organic Absorbing Compounds

Examples of organic UV absorbing compounds suitable for use in the UV resistant pre-mix compositions and articles of the present invention include hydroxybenzophenones, such as 2-hydroxy-4-methoxybenzophenone, 2-hydroxy-4-n-octoxybenzophenone, 2,2'-dihydroxy-4-methoxybenzophenone and 2,4-dihydroxybenzophenone; benzotriazoles, such as 2-(2'-hydroxy-3'-tert-butyl-5'-methylphenyl)-5-chlorobenzotriazole, 2-(2'-hydroxy-3', 5'-di-tert-butylphenyl) -5-chlorobenzotriazole, 2-(2'-hydroxy-5'-methylphenyl)benzotriazole and 2-(2'-hydroxy-3', 5'-di-tert-amylphenyl)benzotriazole; benzoates, such as phenyl salicylate, p-tert-butylphenyl salicylate, 2,4-di-tert-butylphenyl-3,5-di-tert-butyl-4-hydroxybenzoate and hexadecyl-3,5-di-tert-butyl-4-hydroxybenzoate; nickel compounds, such as 2,2'-thiobis(4-tert-octylphenol) Ni salt, [2,2'-thiobis(4-tert-octylphenolate)]-n-butylamine Ni and (3,5-di-tert-butyl-4-hydroxybenzyl)phosphonic acid monoethyl ester Ni salt; substituted acrylonitriles, such as methyl .alpha.-cyano-.beta.-methyl-.beta.-(p-methoxyphenyl) acrylate; oxalic acid dianilides, such as N'-2-ethylphenyl-N-ethoxyphenyloxamide and N-2-ethylphenyl-N'-2-ethoxyphenyloxamide; and hindered amine compounds, such as bis(2,2,6,6-tetramethyl-4-piperidine) sebacate, poly [{(6-(1,1,3,3-tetramethylbutyl)imino}-1,3,5-triazine-2,4-diyl {4-(2,2,6 ,6-tetramethylpiperidyl) imino}hexamethylene] and a condensate of 2-(4-hydroxy-2,2,6,6-tetramethyl-1-piperidyl)ethanol and dimethyl succinate. Preferred UV protectant compounds for addition to non-dermatological compositions are the benzophenones, the benzotriazoles and the hindered amine light stabilizers.

The preparation and use of the foregoing compounds are well-known in the art, but to the best of our knowledge they have never been used to obtain a synergistic effect with particulate zinc oxide UV blocking agents in a pre-mix composition for paints, coatings and plastics. It should be understood that the foregoing list of organic UV absorbers is not intended to be exhaustive.

Examples of organic UV absorbing compounds which are also suitable for use in the present invention as UV absorbers are the following: one or more of the group consisting of oxybenzone(2-hydroxy-4-methoxybenzophenone); dioxybenzone(2,2'-dihydroxy-4-methoxybenzophenone); cinoxate(2-ethoxyethyl-p-methoxycinnamate); diethanolamine-p-methoxycinnamate; digalloyl trioleate ethyl 4-bis(hydroxypropyl)aminobenzoate; 2-ethylhexyl-2-cyano-3,3-diphenylacrylate; ethylhexyl-p-methoxycinnamate; 2-ethylhexyl salicylate; glyceryl aminobenzoate; homosalate(3,3,5-trimethylcyclohexyl salicylate); triethanolamine salicylate; 2-phenylbenzimidazole-5-sulfonic acid; sulisobenzone(2-hydroxy-4-methoxybenzophenone-5-sulfonic acid); Padimate A (amyl p-dimethylaminobenzoate); Padimate O (octyl dimethyl para aminobenzoate); 4-t-butyl-4'-methoxydibenzoylmethane; and the combination of 2-hydroxy-1,4-naphthoquinone with dihydroxyacetone; and menthyl anthranilate, and mixtures thereof; and octyl methoxycinnamate, octacrylene, octyl dimethyl-p-aminobenzoic acid, benzophenone and octyl salicylate, and mixtures thereof.

The most widely used organic-based UV absorbers useful for this invention contain, for example, paraaminobenzoic acid (PABA), PABA esters (glyceryl PABA), amyldimethyl PABA and octyldimethyl PABA), benzophenones (oxybenzone and sulisobenzone), cinnamates (octylmethoxy cinnamate and cinoxate), salicylates (homomethyl salicylate), anthranilates such as menthyl anthranilate, 2-ethylhexyl-2-cyano-3,3-diphenyl acrylate, 2-phenyl benzimidazole-5-sulfonic acid, digalloyl trioleate, 3-(4-methyl benzylidene) camphor, 4-isopropyl dibenzoyl methane, butyl methoxy dibenzoyl methane, 2-ethyl-2-cyano-3,3'-diphenyl acrylate. To date, more than twenty-one such chemicals, useful for this invetion, have been approved by the United States Food and Drug Administration as "safe and effective" agents in protecting skin against sunburn (see, e.g., Pathak, Madhu, "Sunscreens: Topical and Systemic Approaches for Protection of Human Skin Against Harmful Effects of Solar Radiation", Continuing Medical Education Series, J. Am. Acad. Dermat., 7:3 (September 1982) p. 285, 291).

As used herein, the term "coating" is intended to denote residential or commercial coatings for buildings, equipment and other products; it is not intended to encompass topical dermatalogical coatings, such as sunblock or sunscreen lotions or cosmetics incorporating sunblocks or sunscreens.

Typical suitable UV-B type organic UV absorbing agents include substituted para-aminobenzoates, e.g., octyl dimethyl PABA, available from Van Dyk & Co., Inc., Belleville, N.J. 07109 under the tradename Escalol 507 and usually present in the range of about 0 to 8 weight percent (for example 1.5 to 8 weight percent); alkyl esters of para-methoxycinnamate, e.g., octyl para-methoxycinnamate, available from Givaudan Corp., Clifton, N.J. 07104 under the tradename Parasol MCX and usually present in the range of about 0 to 7.5 weight percent (for example 1.5 to 7.5 weight percent); and certain esters of salicylic acid, e.g., homomenthyl salicylate, usually in the range of about 0 to 15 weight percent (for example 4 to 15 weight percent) or octyl salicylate, usually in the range of about 0 to 5 weight percent (for example 3 to 5 weight percent).

Typical suitable UV-A type organic agents include benzophenone-3 usually present in the composition in the range of about 0 to 6 percent (for example 0.5 to 6 percent) and available from American Cyanamid Co., Wayne, N.J. 07470 under the tradename Spectra-Sorb UV-9; benzophenone-8, usually present in the composition in the range of 0 to 3 weight percent (for example 0.5 to 3 weight percent) and available from American Cyanamid Co. under the tradename Spectra-Sorb UV-24; and menthyl anthranilate, usually present in the composition in the range of about 0 to 5 weight percent (for example 3.5 to 5 weight percent) and available from Haarmann and Reimer (N.J.) under the tradename Sunarome UVA.

Organic UV Protective Agents Other Than Absorbers

In addition to the organic UV absorber protectives, the invention also contemplates use of UV protective chemicals which work by other mechanisms than absorbtion, for example, by scavenging injurious free radicals that are generated by ultra-violet light that are typically employed in thermoplastic fabrication and in paint and coating manufacture. Examples are found in Lau et al. U.S. Pat. No. 6,051,637; Samuels U.S. Pat. No. 6,051,164; Shibatoh et al U.S. Pat. No. 6,025,433; and Tanizaki et al., U.S. Pat. No. 5,998,039 and Pickett et al U.S. Pat. No. 6,037,059, incorporated herein by reference. Examples of such UV protectant compounds suitable for use in the invention include: benzotriazole compounds, oxaloanilide compounds, triazine compounds, benzophenone compounds or cyanoacrylate compounds. Examples of benzotriazole compounds include 2-(2-[2-hydroxy-3,5-di-(1,1-dimethylbenzyl)-phenyl]-2H-benzotriazole and methyl-3-(3-2H-benzotriazol-2-yl)-5-t-butyl-4-hydroxyphenyl propionate, and 2-(2'-hydroxy-5'-methacryloxyethylphenyl)-2H-benzotriazole. Examples of an oxalic anilide compound as aforementioned component include ethanediad-o-N-(2-ethoxyphenyl)-N'-(4-isodoceylphenyl)oxalic anilide, etc. Examples of a triazine compound include 2-{4-[(2-hydroxy-3-dodecyloxy-propyl)-oxy]-2-hydroxyphenyl}-4,6-bis(2,4-di methylphenyl)-1,3,5-triazine, etc. Examples of a benzophenone compound include 2,2'-dihydroxy-4,4'-dimethoxybenzophenone, etc. Examples of a cyanoacrylate compound as aforementioned component include ethyl-2-cyano-3,3-diphenyl acrylate, etc.

Preferably a hindered amine compound or hindered phenol compound can be employed. Examples of hindered amine compounds as component include bis(1,2,2,6,6-pentamethyl-piperidyl) sebacate, and 1,2,2,6,6-pentamethyl-4-piperidyl methacrylate. Examples of hindered phenol compounds include tetrakis[methylene-(3,5-di-t-butyl-4-hydroxyhydroxycinnamato)]methane. Products made by BASF use particularly preferred.

Formulations

The present invention is also directed to methods, compositions and articles which employ the combination of an inorganic UV agent (as described above) with one or more of the organic UV agents (as described herein).

In a first embodiment, the invention is directed to providing UV protection for polymeric substrates, such as those used in paints and coating and other types of UV protective coatings (both liquid and powder form), as well as plastic and polymeric product. For plastic product one incorporates into the product, along with the polymeric substrate, an inorganic UV blocking agent i.e. particulate zinc oxide, preferably in micronized form (i.e., size range or about 1 nanometer to about 200 nanometers), and at least one organic UV protective compound.

In a second important embodiment the invention is directed to a premixed formulation or pre-blend prepared as an intermediate or precursor composition for later addition to paints, coatings, finishes and the like or for later addition to plastic resin formulations prior to compounding into various plastic articles. The premix comprises at least one micronized zinc oxide, and at least one organic UV protective compound. The premix may be incorporated into any suitable carrier or diluent, if desired.

With respect to the first above-mentioned embodiment, the present invention contemplates paints, coatings and other finishes, as well as plastic articles, and methods for preparation thereof, which are protected from UV degradation by the incorporation therein of a combination of a particulate zinc oxide, preferably micronized, and at least one organic UV protective compound. The zinc oxide particles are dispersed in a substrate which constitutes the base formulation of liquid coatings or powder coatings, or the base resin of an article to be fabricated using conventional plastic compounding, molding or extrusion processes.

The chemicals into which the U.V resistant compositions of the present invention may be incorporated include a wide variety of resin and plastic materials, for example, polyolefins, polyvinylaromatics, acrylics, polycarbonates, polyesters, polyamides, polyimides, polyarylates, polysulfones, polybutenes, polypropenes, epoxies, and polyvinylhalide resins and generally any resin known to be susceptible to degradation, to one degree or another, upon being exposed to ultraviolet light radiation. Naturally, the choice of organic UV protective compound must be made such that, at the temperatures for processing the paints, coatings, finishes or thermoplastic articles, the organic UV compound does not undergo substantial degradation or cross reaction with any other ingredients of the formulation.

Representative, but nonlimiting, examples of specific polymeric resin materials useful as the resin component in the ultraviolet light stable polymeric resin compositions of this invention include polyolefin resins such as polyethylene and polypropylene and the like; polyvinylaromatic resins such as polystyrene and copolymers and terpolymers therefor, such as poly(styrene-acrylonitrite) and poly (styrene-butadieneacrylonitrile) and the like; acrylic resins such as poly(acrylic acid), poly(methacrylic acid), poly (methyl acrylate), poly(methyl methacrylate) and the like; polycarbonate resins such as those obtained either by the phosgenation of dihydroxy aliphatic and aromatic monomers such as ethylene glycol, propylene glycol, bisphenol A (i.e., 4,4'-isopropylidene diphenol) and the like, or by the base catalyzed transesterification of bisphenol A with diphenylcarbonate to produce bisphenol A polycarbonate; polyester resins such as poly(ethylene terephthalate), poly(butylene terephthalate) and the like; polyamide resins such as nylon-6, nylon-6,6 and the like; epoxy resins such as poly(epichlorohydrin/bisphenol A) and the like, and esters thereof such as the epoxy resin esters prepared by the esterification of poly(epichlorohydrin/bisphenol A) with a fatty acid, rosin acid, tall oil acid or mixtures thereof; and phenolic resins such as those prepared by reaction of formaldehyde with phenol, resorcinol, cresol, xylenol, p-tert-butylphenol and the like.

Particularly useful UV light stable polymeric resin compositions of the present invention, are those polymeric resin compositions wherein the polymeric resin component comprises a poly(vinylhalide) resin. Such preferred poly(vinylhalide) resins include poly(vinylchloride) homopolymer resins as well as poly(vinylchloride) copolymer resins resulting from the copolymerization of vinyl chloride monomer with a second monomer such as, for example, other unsaturated halogenated hydrocarbons, styrene and its halogenated derivatives, vinyl esters and ethers, olefins, dienes, esters and other derivatives of acrylic and methacrylic acids, and olefinic dicarboxylic acids and esters thereof. Representative examples of such copolymerizable second monomers or comonomers include vinylidene chloride, vinyl acetate, vinyl isobutyl ether, ethylene, propylene, isoprene, butadiene, methyl acrylate, methyl methacrylate and the like. Typically, commercially available poly(vinylchloride) copolymer resins can contain from about 2 to about 20 weight percent of the copolymerized comonomer. A more detailed description of poly(vinylchloride) homopolymer and copolymer resins useful as the polymeric resin component in the ultraviolet light stabilized polymeric resin compositions of this invention can be found in Kirk-Othmer, Encyclopedia of Chemical Technology, Volume 21, pp 369–379 and pp 402–405, 2ed. (1968), the teachings of which are incorporated herein in their entirely by reference. Particularly useful poly(vinylchloride) resins for preparing the UV light stabilized polymeric resin compositions of this invention are the rigid poly(vinylchloride) homopolymer resins.

The amount of zinc oxide particles in the paint, coating or finish composition is preferably in the range of about 0.5 to about 5.0 weight percent based on the total weight of the composition. The amount of organic UV protective compound is preferably in the range of about 0.1 to about 1.0 weight percent based on the total weight of the composition.

The organic UV protective compounds for use in the polymeric products described above may be selected not only from the types of UV protective compounds typically employed in plastic articles discussed above, such as, for example, the benzophenones, the benzotriazoles, and the hindered amine light stabilizers, but surprisingly may also include the wide array of UV absorbing compounds, that have been found useful for dermatological applications, for example cosmetic and sunscreen preparations.

Specific examples of organic UV protective compounds that can be used in the present invention (and their CAS numbers) include: 4-aminobenzoic acid (150-13-0); 3-(4-trimethylammoniobenzylidene)-2-bornanone methyl sulfate (52793-97-2); 3,3,5-trimethylcyclohexyl salicylate (homosalate) (118-56-9); 2-hydroxy-4-methoxybenzophenone (oxybenzone) (131-57-7); 2-phenylbenzimidazole-5-sulfonic acid and its potassium, sodium and triethanolamine salts (27503-81-7); 3,3'-(1,4-phenylenedimethine)bis(7,7-dimethyl-2-oxobicyclo [2.2.1] heptane-1-methanesulfonic acid) and its salts (90457-82-2); Polyethoxyethyl 4-bis(polyethoxy) aminobenzoate (113010-52-9); 2-ethylhexyl 4-dimethylaminobenzoate (21245-02-3); 2-ethylhexyl salicylate (118-60-5); 2-isoamyl 4-methoxycinnamate (7/6/7-10-2); 2-ethylhexyl 4-methoxycinnamate (5466-77-3); 12 2-hydroxy-4-methoxybenzophenone-5-sulfonic acid (sulisobenzone) and the sodium salt (4065-45-6); 3-(4-sulfobenzylidene)-2-bornanone and salts (58030-58-6); 3-(4-methylbenzylidene)-2-bornanone (36861-47-9); 3-benzylidene-2-bornanone (16087-24-8); 1-(4-isopropylphenyl)3-phenyl-1,3-propanedione (63260-25-9); 4-isopropylbenzyl salicylate (94134-93-7); 2,4,6-tri(o-2-ethylhexoxycarbonylanilino)-1,3,5-triazine (88122-99-0); 3-(4-imidazole-4-yl)acrylic acid and its ethyl ester (104-98-3); ethyl 2-cyano-3,3-diphenylacrylate (5232-99-5); 2-ethylhexyl 2-cyano-3,3-diphenylacrylate (6197-30-4); menthyl o-aminobenzoate or 5-methyl-2-(1-methylethyl) cyclohexyl 2-aminobenzoate (134-09-8); glyceryl p-aminobenzoate or 4-aminobenzoic acid 1-glyceryl ester (13644-7); 2,2'-dihydroxy-4-methoxybenzophenone (dioxybenzone) (131-53-3); 2-hydroxy-4-methoxy-4'-methylbenzophenone (mexenone) (1641-17-4); triethanolamine salicylate (2174-16-5); dimethoxyphenylglyoxalic acid or sodium 3,4-dimethoxyphenylglyoxalate; 3-(4-sulfobenzylidene)-2-bornanone and its salts (56039-58-8). [this listing was quoted directly from 5,968,484 from 3 and 4].

Particularly preferred UV protective compounds disclosed in connection with dermatological sunscreen use in Liu et al U.S. Pat. No. 5,916,544; Siddiqui et al. U.S. Pat. 6,015,548; Mitchnicketal. U.S. Pat. No. 5,733,531; Tanner et al. U.S. Pat. No. 5,989,528; and Luther et al. U.S. Pat. No. 5,980,872, incorporated herein by reference. If desired, the organic UV absorbers, like the inorganic sunblock, may also be micronized in the manner described in the Luther et al. '872 patent.

In addition to the novel inorganic/organic UV protectant composition of the present invention, the final products incorporating that composition may also include conventional fillers and pigments and other additives typically found in paints, coatings, finishes and plastic articles.

In a further important embodiment of the invention, there is provided a premix composition which comprises a particulate zinc oxide, preferably micronized zinc oxide, and at least one organic UV protective compound. This pre-mix composition preferably comprises about 20 to about 60 weight percent of the mixture of the micronized zinc oxide and about 3 to about 30 by weight percent of the mixture of the ultraviolet UV protective compound which may be UV agents described above. Also, the premix may contain a suitable carrier such as naphta as well as other materials. The composition may be used as a convenient premixed preparation that is merely added to the substrate used to fabricate a paint, coating, finish, plastic, or polymer-based product.

In the case of paint, coatings and finishes, the composition may be in the form of a liquid for preparation of liquid end products, or in the form of a solid dispersion in the case of powdered end products. Preferably, the composition may employ as its carrier component, the same polymeric material used in the finished product.

A major advantage of the preblended compositions, in addition to the enhanced UV protection afforded by the combination of inorganic and organic UV stabilizers, is the ability of suppliers of these products to prepare custom made "premixes" which may then be purchased by paint, coating and plastics fabricators to obviate the need for separate metering of the UV components at the point of manufacture of the finished coatings or articles. As in the case of the finished compositions and articles referred to above, the micronized xinc oxide preferably has a size range of about 1 nanometer to about 200 nanometers, and most preferably within a range of about 10 nanometers to about 150 nanometers. The premix compositions of the invention require no special preparation but may be made by simply admixing the dry (or liquid) components in the desired proportions. The premix thus formed is a stable homogeneous dispersion of the UV inorganic and organic components in the desired liquid or solid carrier.

EXAMPLE 1

This Example illustrates the preparation of a premix composition adapted for incorporation into a paint, coating, finish or plastic article in accordance with the present invention.

The premix composition was prepared by admixing the following ingredients in the amounts and proportions set forth:

|  | WT | % by WT |
|---|---|---|
| PM Acetate | 34.30 | 22.87 |
| Aromatic 100 | 34.30 | 22.87 |
| EFKA ® 150 | 11.05 | 7.37 |
| BENTONE ® 52 | 1.50 | 1.00 |
| EFKA ® 47 | 7.35 | 4.90 |
| TZO ™ | 52.50 | 35.00 |
| Uvinul ® 5050 H | 9.00 | 6.00 |
| Total | 150.00 | 100.00 |

Wherein:
PM Acetate is propylene glycol methylether acetate
Aromatic 100 is a light aromatic solvent naphtha
EFKA 150 is a fatty acid modified polymer
BENTONE® 52 is an organo-bentonite clay
EFKA 47 is a high molecular weight modified urethane dispersant
TZO is a transparent zinc oxide UV blocking agent having an average particle size of about 60 nanometers which is manufactured and sold by Elementis Specialties
Uvinul 5050—CAS 152261-33-1 is a hindered amine organic UV protective agent manufactured and sold by BASF

What is claimed is:

1. A premix composition adapted for incorporation into a paint, coating, plastic or polymeric formulation comprising a mixture of a zinc oxide UV blocking agent having a particle size in the range of about 1 to about 200 nanometers and one or more organic UV protective compounds.

2. The premix composition of claim 1 wherein the zinc oxide UV blocking agent is micronized zinc oxide and is present in the mixture in an amount of about 20 to about 60% by total weight of the mixture.

3. The premix composition of claim 1 including a liquid or solid carrier.

4. The composition of claim 1 wherein the organic UV protective compound is selected from the group consisting of PABA compounds, benzophenone compounds, cinnamate compounds, salicylate compounds, anthranilate compounds, dibenzoylmethane compounds, benzotriazole compounds, triazine compounds, hindered amine light stabilizer compounds and mixtures thereof.

5. The premix composition of claim 1 wherein the organic UV protective compound or compounds is present in the mixture in an amount of about 3 to about 30% by total weight of the pre-mix composition.

6. An ultraviolet resistant paint, coating, finish or varnish composition comprising:
 a) a binder/substrate material;
 b) a micronized zinc oxide particulate inorganic metal oxide UV blocking agent; and
 c) at least one organic UV protective compound.

7. The composition of claim 6 wherein the binder/substrate material is a polymeric composition.

8. The composition of claim 6 wherein the micronized zinc oxide has an average particle size within the range of about 1 nanometer to about 200 nanometers.

9. The composition of claim 6 wherein the micronized zinc oxide is zinc oxide having a particle size in the range of about 10 nanometers to about 150 nanometers.

10. The composition of claim 9 wherein the micronized zinc oxide has an average particle size of about 80 nanometers or less and a surface area of at least 12.5 $m^2$/g.

11. The composition of claim 6 wherein the organic UV protective compound is selected from the group consisting of PABA compounds, benzophenone compounds, cinnamate compounds, salicylate compounds, anthranilate compounds, dibenzoylmethane compounds, benzotriazole compounds, triazine compounds, hindered amine light stabilizer compounds and mixtures thereof.

12. The composition of claim 6 wherein the composition is a liquid.

13. The composition of claim 6 wherein the composition is a powdered solid.

14. The composition of claim 7 wherein the polymeric composition is selected from the group consisting of polyolefins, polyvinylaromatics, acrylics, polycarbonates, polyesters, polybutenes, polyamides, polyimides, epoxies, polyvinylhalide resins and mixtures thereof.

15. A plastic article comprising
 a) a polymeric resin substrate;
 b) a micronized zinc oxide selected from the group consisting of wurtzite and amorphous zinc oxide; and
 c) at least one organic UV protective compound.

16. The plastic article of claim 15 wherein the polymeric resin substrate is a thermoplastic polymeric resin.

17. The plastic article of claim 15 wherein the micronized zinc oxide UV has a particle size within the range of about 1 nanometer to about 200 nanometers.

18. The plastic article of claim 17 wherein the micronized zinc oxide has a particle size in the range of about 10 nanometers to about 150 nanometers.

19. The plastic article of claim 18 wherein the micronized zinc oxide has an average particle size of about 80 nanometers or less and a surface area of at least 12.5 $m^2$/g.

20. The plastic article of claim 15 wherein the organic UV protective compound is selected from the group consisting of PABA compounds, benzophenone compounds, cinnamate compounds, salicylate compounds, anthranilate compounds, dibenzoylmethane compounds, benzotriazole compounds, triaxine compounds, hindered amine light stabilizer compounds and mixtures thereof.

21. The plastic article of claim 15 wherein the polymeric resin substrate is selected from the group consisting of polyolefins, polyvinylaromatics, acrylics, polycarbonates, polyesters, polybutenes, polyamides, polyimides, epoxies, polyvinylhalide resins and mixtures thereof.

22. A method of manufacturing ultraviolet resistant paints, coatings, finishes, or plastic articles which comprises:
 a) providing a sufficient amount of a binder/substrate material effective to act as a base for the production of a product selected from the group consisting of paints, coatings, finishes, and plastic articles; and b) admixing an effective amount of a premix composition with the binder/substrate material to produce the product, the premix composition comprising micronized zinc oxide UV and at least one organic UV protective compound.

23. The method of claim 22 wherein the micronized zinc oxide is selected from the group consisting of wurtzite and amorphous zinc oxides and mixtures thereof.

24. The method of claim 22 wherein the micronized zinc oxide has an average particle size in the range of about 1 nanometer to about 200 nanometers.

25. The method of claim 22 wherein the micronized zinc oxide has a particle size in the range of about 10 nanometers to about 150 nanometers.

26. The method of claim 25 wherein the micronized zinc oxide has an average particle size of about 80 nanometers or less and a surface area of at least 12.5 $m^2/g$.

27. The method of claim 22 wherein the organic UV protective compound is selected from the group consisting of PABA compounds, benzophenone compounds, cinnamate compounds, salicylate compounds, anthranilate compounds, dibenzoylmethane compounds, benzotriazole compounds, triazine compounds, hindered amine light stabilizer compounds and mixtures thereof.

28. The method of claim 22 wherein the binder/substrate material is a liquid.

29. The method of claim 22 wherein the binder/substrate material is a powdered solid.

30. The method of claim 22 wherein the binder/substrate material is a polymeric resin selected from the group consisting of polyolefins, polyvinylaromatics, acrylics, polycarbonates, polyesters, polybutenes, polyamides, polyimides, epoxies, polyvinylhalide resins and mixtures thereof.

* * * * *